US008611736B2

(12) United States Patent
Ando et al.

(10) Patent No.: US 8,611,736 B2
(45) Date of Patent: Dec. 17, 2013

(54) IMAGE SENSING DEVICE, IMAGE SENSING DEVICE CONTROL METHOD, AND PROGRAM FOR THE CONTROL METHOD

(75) Inventors: Akira Ando, Chigasaki (JP); Toshiyuki Yokoyama, Hitachinaka (JP); Tomoaki Nishiguchi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 13/325,275

(22) Filed: Dec. 14, 2011

(65) Prior Publication Data

US 2012/0155847 A1 Jun. 21, 2012

(30) Foreign Application Priority Data

Dec. 17, 2010 (JP) .................................. 2010-281444

(51) Int. Cl.
*G03B 13/36* (2006.01)
(52) U.S. Cl.
USPC ........................................................... 396/80
(58) Field of Classification Search
USPC ...................................................... 396/79–82
See application file for complete search history.

(56) References Cited

U.S. PATENT DOCUMENTS

| 5,315,340 A * | 5/1994 | Hirasawa ........................ 396/81 |
| 5,802,405 A * | 9/1998 | Sugimoto ........................ 396/82 |
| 5,943,513 A * | 8/1999 | Kim ................................. 396/82 |
| 6,144,805 A * | 11/2000 | Ogino ............................. 396/81 |
| 6,993,256 B2 * | 1/2006 | Ogg et al. ........................ 396/81 |
| 7,551,847 B2 * | 6/2009 | Triteyaprasert ................. 396/79 |
| 2012/0155847 A1 * | 6/2012 | Ando et al. ..................... 396/125 |

FOREIGN PATENT DOCUMENTS

| JP | 05-119249 A | 5/1993 |
| JP | 11-281869 A | 10/1999 |
| JP | 2001-208955 A | 8/2001 |
| JP | 2005-62665 A | 3/2005 |
| JP | 2006-215285 A | 8/2006 |

* cited by examiner

*Primary Examiner* — W B Perkey
(74) *Attorney, Agent, or Firm* — Mattingly & Malur, PC

(57) ABSTRACT

For preventing frequent use of auto-focus control and also for acquiring stable in-focus positions for target-objects, this invention comprises system control section 60 having a second mode to drive magnification adjustment lens 11 or focus adjustment lens 12 upon a user command, and a third mode to transition to a first mode under pre-determined conditions in the second mode, and to set in-focus states of a lens group, wherein system control section 60 stores a reference target-object distance in reference target-object distance storage section 43 when focus adjustment lens 12 is driven by user commands in the second mode, drives focus adjustment lens 12 not based on a current target-object distance but the lens in-focus trajectory data to retain the reference target-object distance when the magnification adjustment lens 11 is driven by user commands, and re-transitions to the second mode without updating the reference target-object distance, after the third mode.

15 Claims, 4 Drawing Sheets

IMAGE SENSING DEVICE, IMAGE SENSING DEVICE CONTROL METHOD, AND PROGRAM FOR THE CONTROL METHOD

CROSS REFERENCE TO RELATED APPLICATION

This application claims priority under 35 U.S.C. §119 to Japanese Patent Application No. 2010-281444 filed on Dec. 17, 2010, the disclosure of which is incorporated herein by reference.

BACKGROUND OF THE INVENTION

1. Field of the Invention

The present invention relates to an image sensing device, more particularly, to an image sensing device which is capable of switching an auto-focus control and a manual control.

2. Description of the Related Art

In image sensing devices such as surveillance cameras, video cameras, or the like, the auto-focus control and the manual control are extensively utilized. Further, the manual control includes two types which are a manual-focus control and a manual-focus-trace control. Incidentally, in this specification, the auto-focus control is denoted by a first mode, and the manual control is denoted by a second mode.

The auto-focus control is a control for performing focus adjustment automatically by driving a focus-lens automatically. To the contrary, the manual-focus control is a control for a user to drive a focus-lens manually for performing focus adjustment. The manual-focus-trace control is a control for a user to drive the zoom-lens manually and then to drive the focus-lens automatically so as to maintain the in-focus state for the identical target object, even after the zoom-lens is traveled.

In the case of the manual-focus-trace control, when the zoom-lens is traveled, the focus-lens needs to be traveled to an exact corresponding position in order to perform focus adjustment on a target object which is located in the identical target object distance. Here, a lens in-focus trajectory data, which indicates a position of the zoom-lens and a position of the focus-lens, is utilized.

Here, the lens in-focus trajectory data is explained with reference to FIG. 4.

FIG. 4 is a diagram showing a graph of the lens in-focus trajectory data.

As shown in FIG. 4, a horizontal axis on the graph represents the position of the zoom-lens, and a vertical axis shows the position of the focus-lens. The diagram shows in-focus positions of both lenses for the identical target object distance. A plurality of curves, in accordance with the target object distance, are shown in the diagram on the tele-side position of the zoom-lens. Based on this diagram, the position of the focus-lens is determined in accordance with the position of the zoom-lens determined by the user.

On the other hand, in the case of surveillance cameras which perform a long-time video-shooting, in consideration of a life of driving the focus-lens, the manual control is mainly utilized, and is changed to the auto-focus control only if an in-focus position adjustment is required with a high precision. One example is a control method to switch from the manual control to the auto-focus control when the user issues a command or manipulates a button, thereafter, to switch back to the manual control after the in-focus position adjustment is completed. Furthermore, the other example is a control method to perform the manual control while the zoom-lens is being traveled, then subsequently to switch from the manual control to the auto-focus control immediately after the zoom-lens is traveled, thereafter to switch back to the manual control after the in-focus position adjustment is completed.

(For example, see JP 2005-62665 A, JP 2006-215285 A and JP H11-281869 A.)

JP 2005-62665 A discloses a technique to switch from the auto-focus control to the manual control immediately after the in-focus position adjustment is completed in the auto-focus control.

JP 2006-215285 A discloses a control technique to determine whether the zoom-lens is being traveled or not, to prohibit the auto-focus control while the zoom-lens is being traveled, and to enable the auto-focus control while the zoom-lens is not being traveled. Moreover, JP 2006-215285 A also describes that, in the case of performing focus adjustment on the required target object by traveling the zoom-lens to the tele-side before starting the shooting, the in-focus position can be adjusted, by disabling the auto-focus control in the wide-side, even if the zoom-lens is traveled to the tele-side.

JP H11-281869 A discloses a technique to travel the focus-lens onto an infinity tracking curve (a curve to indicate the zoom-lens position and the focus-lens position) and to fix the focus-lens when a zoom-lens operation command is issued, subsequently, to travel the zoom-lens and the focus-lens along the infinity tracking curve, then, to perform focus adjustment by the auto-focus control once the zooming operation is completed, and thereafter, to turn off the focus motor.

SUMMARY OF THE INVENTION

However, in the case of the technique disclosed in JP 2005-62665 A, a target object distance is set at the focus-lens position where the target object is in focus by the auto-focus control and then the auto-focus control is switched to the manual-focus control. Thus, there has been an out-of-focus problem which is caused, for example as shown in FIG. 4, when the auto-focus control is performed on the wide-side having a lower focus-driving resolution, and subsequently the manual-focus-trace control is performed on the tele-side having a greater focus-driving resolution, at the target object distance which has been set.

On the other hand, the technique disclosed in JP 2006-215285 A is not preferable in consideration of the life of driving the focus-lens, since the manual control is turned on only if the zoom-lens is traveled and the auto-focus control is constantly performed. Furthermore, the technique disclosed in JP 2006-215285 A has the identical problem as that in the technique disclosed in JP 2005-62665 A, when the auto-focus control is enabled in the wide-side. In addition, when the auto-focus control is disabled on the wide-side, the auto-focus control is not performed on the wide-side, thus, the focus-lens position is not always optimized, and consequently a deterioration problem of the focusing precision is caused.

In the technique disclosed in JP H11-281869 A, there has been a problem that the user cannot arbitrarily set a target object distance depending on the target object during the zoom-lens operation, since the focus-lens position, during the zoom-lens operation, is fixed to a pre-determined target object distance such as the infinity or the like for the control purpose.

Therefore, the present invention is made in consideration of the aforementioned problems, and an object of the present invention is to provide an image sensing device, an image sensing device control method, and a program for the control method which acquire the stable in-focus position for the target object, while avoiding the frequent use of the auto-focus control.

In order to solve the foregoing problem, the present invention provides an image sensing device comprising: a lens group having a magnification adjustment lens and a focus adjustment lens; a focus evaluation detection section for detecting a focus evaluation value which evaluates an in-focus state of the lens group; a lens in-focus trajectory data storage section for storing a lens in-focus trajectory data which is a pre-determined data to indicate a lens position of the lens group in the in-focus state; a reference target object distance storage section for storing a target object distance; and a system control section having a first mode simultaneously to operate and to automatically set the in-focus state of the lens group, a second mode to drive the magnification adjustment lens or the focus adjustment lens based on a user command, and a third mode to transition to the first mode under a pre-determined condition in the second mode, and to automatically set the in-focus state of the lens group, wherein the system control section stores a target object distance as a reference target object distance in the reference target object distance storage section based on the lens focusing trajectory data when the focus adjustment lens is driven by the user command in the second mode, drives the focus adjustment lens so as to retain the reference target object distance not based on a current target object distance but based on the lens in-focus trajectory data and the reference target object distance when the magnification adjustment lens is driven by the user command, and transitions to the second mode again without updating the reference target object distance after the third mode.

DETAILED DESCRIPTION OF THE PREFERRED EMBODIMENT

Hereinafter, an embodiment of the present invention is described with reference to the accompanying drawings.
<Configuration of Image Sensing Device 1>

Figure 1:
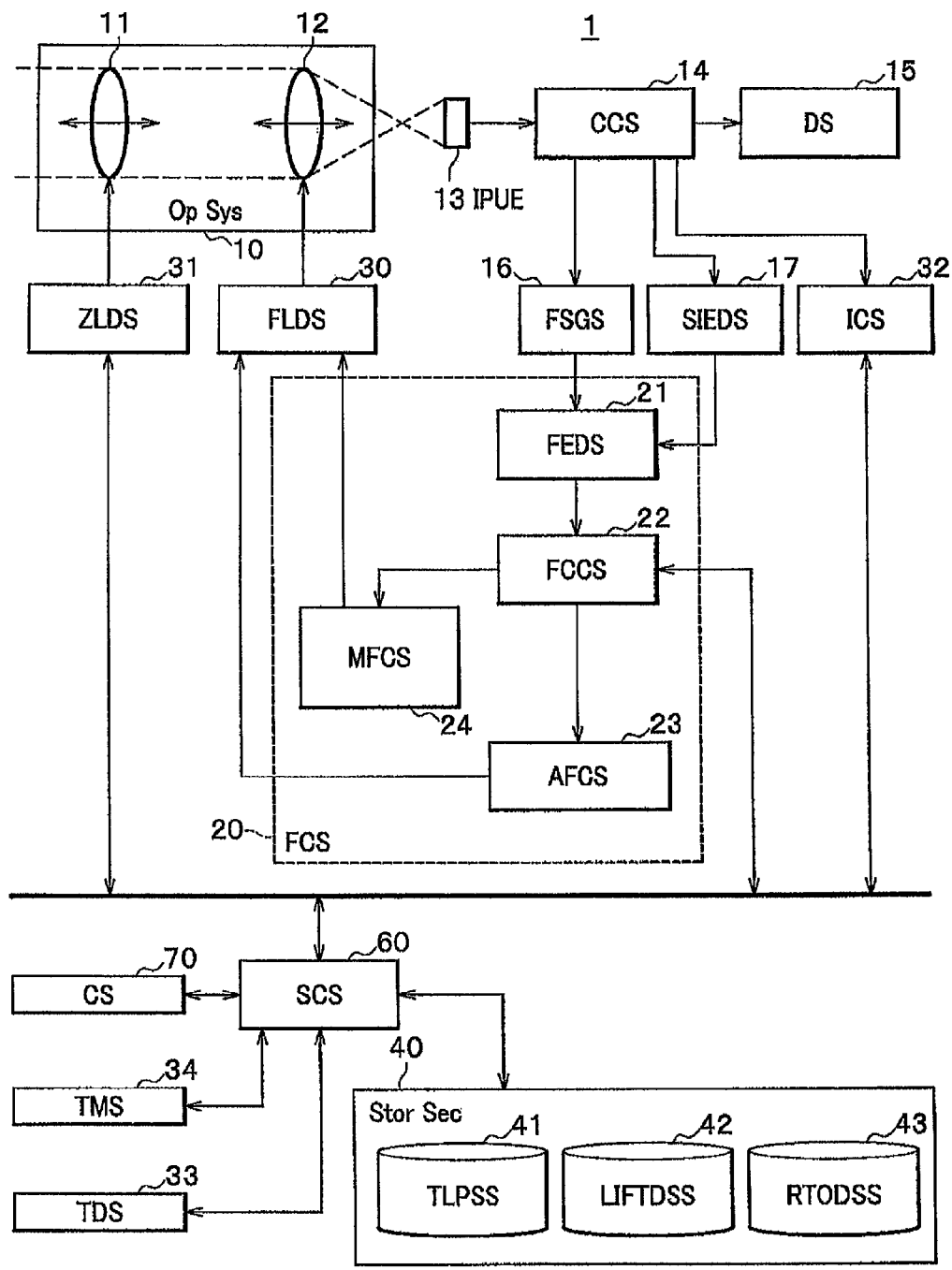
FIG. 1 is a block diagram showing a configuration of an image sensing device of the present invention.

As shown in FIG. 1, the image sensing device 1 comprises an optical system (Op Sys) 10, an image pick-up element (IPUE) 13, a camera control section (CCS) 14, a display section (DS) 15, a focus signal generation section (FSGS) 16, a screen intensity evaluation detection section (SIEDS) 17, a focus control section (FCS) 20, a focus-lens drive section (FLDS) 30, a zoom-lens drive section (ZLDS) 31, an illuminance control section (ICS) 32, a temperature detection section (TDS) 33, a time measurement section (TMS) 34, a storage section (Stor Sec) 40, a system control section (SCS) 60, and a command section (CS) 70.

In this embodiment, a surveillance camera is explained as an example of the image sensing device 1. The command section 70 is provided in order to manipulate the surveillance camera for the user located away from the surveillance camera.

A target object being shot is formed into an optical image on the light sensing surface of the image pick-up element 13, through the zoom-lens 11 (magnification adjustment lens) and the focus-lens 12 (focus adjustment lens) which belong to the optical system 10.

The zoom-lens 11 (magnification adjustment lens) is a lens provided for the magnification adjustment and is capable of traveling between the position of the low magnification (wide-side) and the position of the high magnification (tele-side).

The focus-lens 12 (focus adjustment lens) is a lens provided for the focus adjustment and is capable of traveling for the adjustment of the in-focus distance.

The lens group consists of the zoom-lens 11 and the focus-lens 12.

The image pick-up element 13 photoelectric-converts the optical image formed on the light sensing surface and outputs the photoelectric-converted image to the camera control section 14.

The camera control section 14 is a circuit to generate a video signal from the electric signal which is input from the image pick-up element 13 and to output the generated video signal to the display section 15, the focus signal generation section 16, the screen intensity evaluation detection section 17, and the illuminance control section 32.

The display section 15 is a display apparatus to confirm a picture of the target object being shot.

The focus signal generation section 16 is a circuit to extract a portion of the pre-determined frequency band from the intensity signal of the video signal which is input from the camera control section 14, to generate a focus signal which shows a mountain-shaped wave peaking at the in-focus point, and to output the focus signal to the focus control section 20.

The screen intensity evaluation detection section 17 is a circuit to calculate, from the intensity signal of the video signal which is input from the camera control section 14, the count of the image pixels having the intensity level equal to or greater than the pre-determined intensity level on the entire screen to generate an intensity evaluation value, and to output the intensity evaluation value to the focus control section 20.

The focus control section 20 is a circuit comprising a focus evaluation detection section (FEDS) 21, a focus control command section (FCCS) 22, an auto-focus control section (AFCS) 23, and a manual-focus control section (MFCS) 24.

The focus evaluation detection section 21 detects an inclination level and an inclination polarity of the focus signal generated by the focus signal generation section 16 and the absolute level of the focus signal or the like as focus evaluation values, and outputs the focus evaluation values to the focus control command section 22. Based on the focus evaluation values, the in-focus position of the focus-lens 12 (focus adjustment lens) can be acquired.

The focus control command section 22 determines a driving direction, a driving velocity, a driving range of the focus-lens 12 (focus adjustment lens) or the like based on the signal from the focus evaluation detection section 21 and the system control section 60 to be described later, and outputs the determined driving direction, driving velocity, driving range or the like to the auto-focus control section 23 or the manual-focus control section 24.

The auto-focus control section 23 is a circuit to output a driving signal to the focus-lens drive section 30 based on a command from the focus control command section 22, when the auto-focus control is selected.

The manual-focus control section 24 is a circuit to output the driving signal to the focus-lens drive section 30 based on a command from the focus control command section 22, when the manual control (the manual-focus control or the manual-focus-trace control) is selected.

The focus-lens drive section 30 is a circuit to control the driving motor of the focus-lens 12 (focus adjustment lens) and outputs the driving signal from the auto-focus control section 23 or the manual-focus control section 24 to the focus-lens 12 (focus adjustment lens).

The zoom-lens drive section 31 is a circuit to control the driving motor of the zoom-lens 11 (magnification adjustment lens) and outputs the driving signal from the system control section 60 to be described later to the zoom-lens 11 (magnification adjustment lens).

The illuminance control section 32 generates an illuminance evaluation value, i.e., an intensity level of the video signal which is input from the camera control section 14 and outputs the illuminance evaluation value to the system control section 60.

The temperature detection section 33 acquires a current temperature with regard to the optical system 10 having the zoom-lens 11 (magnification adjustment lens) and the focus-lens 12 (focus adjustment lens) as temperature information. In this embodiment, a thermistor is utilized.

The time measurement section 34 measures the in-focus duration time.

Each of the section 14, 16, 17, 21-24, 30-34, 60, and 70 controls the image sensing device 1, and includes CPU (Central Processing Unit), ROM (Read Only Memory), RAM (Random Access Memory), various interfaces and the like, and controls the various circuits.

The command section 70 detects the command issued by the user.

The storage section 40 comprises a temperature and lens position storage section (TLPSS) 41 for storing the temperature and the position of the lens, a lens in-focus trajectory data storage section (LIFTDSS) 42 for storing the lens in-focus trajectory data, and a reference target object distance storage section (RTODSS) 43 for storing the reference target object distance which is a target object distance to be a reference.

Incidentally, the image sensing device 1 can be realized with a commonly used computer including a built-in CPU and a memory (not shown). Here, the image sensing device 1 is operated by the image sensing device control program so that the computer functions as each of the aforementioned means.

<Operation of Image Sensing Device 1>

Next, the operation of the image sensing device 1 is described with reference to FIG. 2, FIG. 3, and FIG. 5 (see FIG. 1 for the configuration, as required).

In this embodiment, when the pre-determined condition to be described later is satisfied during the manual control, the auto-focus control for the focus adjustment is automatically turned on, then, after the auto-focus control is performed, the manual control is automatically turned on. Incidentally, in this specification, the regular auto-focus control is denoted by a first mode, and the manual control is denoted by a second mode. The second mode includes the manual-focus control and the manual-focus-trace control as described later. Moreover, when the pre-determined condition is satisfied during the manual control, the auto-focus control is automatically performed for the focus adjustment. This auto-focus control for the focus adjustment is denoted by a third mode.

Here, as aforementioned, the auto-focus control is a control to automatically drive the focus-lens 12 (focus adjustment lens) and to automatically perform focus adjustment. Furthermore, the manual control includes a manual-focus control and a manual-focus-trace control.

The manual-focus control means to control the focus-lens 12 (focus adjustment lens) driven manually by the user to perform focus adjustment manually.

The manual-focus-trace control means to drive the zoom-lens 11 (magnification adjustment lens) manually by the user and to automatically drive the focus-lens 12 (focus adjustment lens) so that the identical target object can remain in the in-focus state even after the zoom-lens is traveled. The manual-focus-trace control automatically performs focus adjustment in a manner harmonized with the zoom-in and the zoom-out operations, even if the user manually performs the zoom-in and the zoom-out operations after manually performing focus adjustment. Thus, the user doesn't need to perform focus adjustment.

Moreover, the prerequisite for the operation of this image sensing device 1 is that the user has driven the focus-lens 12 (focus adjustment lens) for performing focus adjustment in the manual-focus control and the position of the focus-lens 12 (focus adjustment lens) is almost in the in-focus state. The auto-focus control for the focus adjustment is exclusively for performing fine adjustment.

Firstly, the outline of the operation of the zoom-lens 11 (magnification adjustment lens) and the focus-lens 12 (focus adjustment lens) are described with reference to FIG. 5.

In the manual-focus control, the point 501 shows the positions at which the user determines the in-focus position of the focus-lens 12 (focus adjustment lens). Next, in the manual-focus-trace control, when the user travels the zoom-lens 11 (magnification adjustment lens) to the position of the point 502, the position of the focus-lens 12 (focus adjustment lens) travels to a position of the point 502 along the curve of the target object distance a, automatically.

Subsequently, in the auto-focus control, the position of the focus-lens 12 (focus adjustment lens) is automatically determined and travels to the position of the point 503. Thereafter, when the user travels the zoom-lens 11 (magnification adjustment lens) to the position of the point 501, the position of the focus-lens 12 (focus adjustment lens) travels back to the curve of the target object distance a and also travels to the position of the point 501, then, travels to a position of the point 501 along the curve of the target object distance a, once the position of the point 504 is reached.

Figure 2:
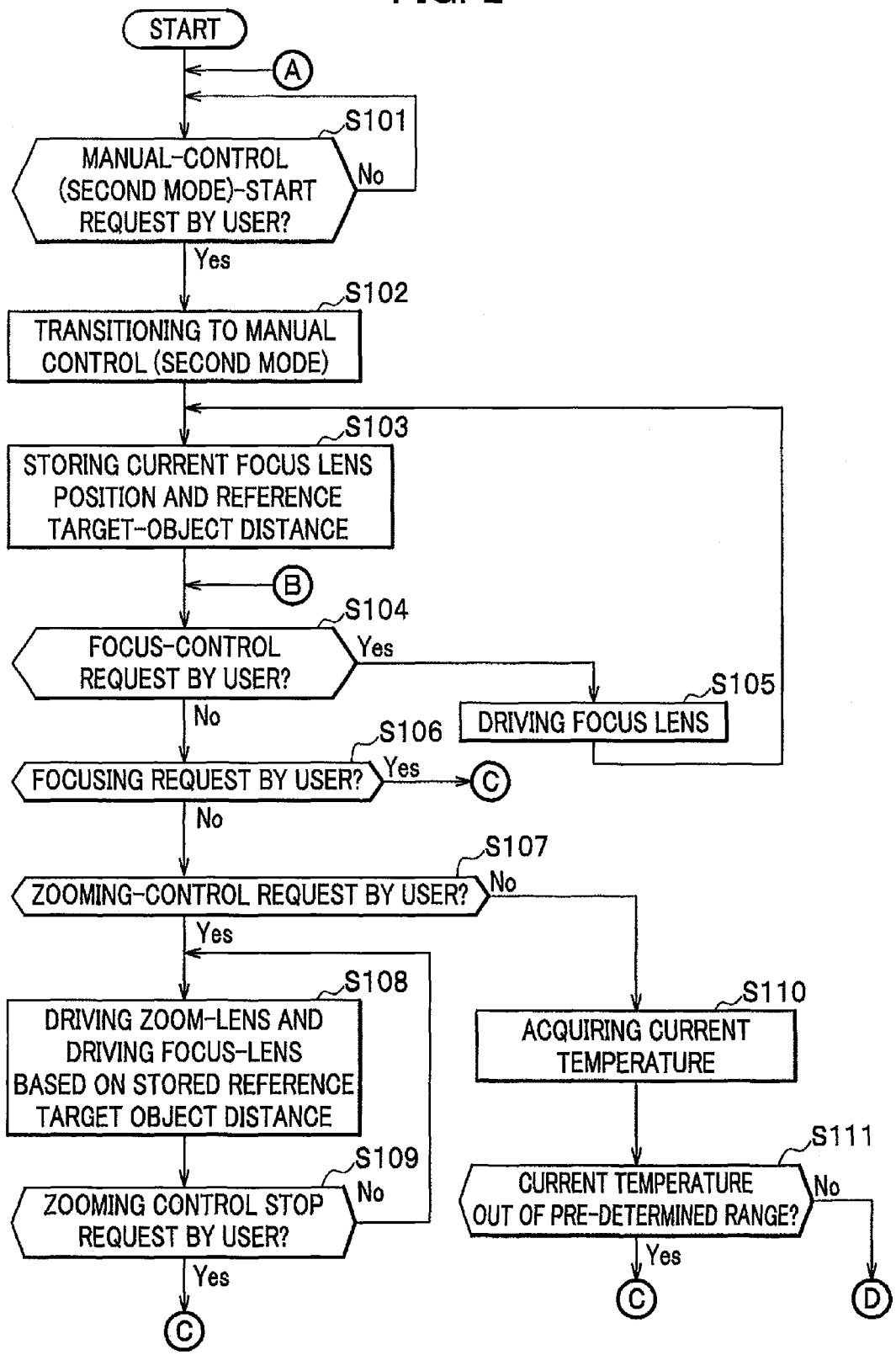
FIG. 2 is a flow chart showing a processing operation of an image sensing device of the present invention.

As shown in the flow chart of FIG. 2, in the step S101, the system control section 60 determines whether the user requests the manual control (second mode) start or not. When the manual control (second mode) start is not requested (step S101: No), the system control section 60 remains standby until the manual control start is requested.

On the other hand, when the manual control (second mode) start is requested (step S101: Yes), in the step S102, the system control section 60 transitions to the manual control (second mode). That is, the system control section 60 issues a command of the manual-focus control to the focus control command section 22, thereafter, the focus control command section 22 switches the object of the command to the manual-focus control section 24. Accordingly, the manual-focus control is started and the auto-focus control is stopped.

In the step S103, the image sensing device 1 stores the current position of the focus-lens 12 (focus adjustment lens) and the reference target object distance. That is, the system control section 60 outputs the lens in-focus trajectory data to the focus control command section 22. The focus control command section 22 calculates a current target object distance from the current position of the focus-lens 12 (focus adjustment lens) and the lens in-focus trajectory data, and stores the current target object distance as the reference target object distance in the reference target object distance storage section 43.

In the step S104, the system control section 60 determines whether a focus control start is requested by the user or not. That is, this is to determine whether the user has issued the command to drive the focus-lens 12 (focus adjustment lens) or not.

When the focus control is requested (step S104: Yes), in the step S105, the focus-lens drive section 30 drives the focus-lens 12 (focus adjustment lens). Next, the image sensing device 1 is processed back in the step S103. Thereafter, in the step S103, the current target object distance is calculated in the same procedure from the current position of the focus-lens 12 which has been driven, and the reference target object distance is updated by storing the current target object distance as the reference target object distance in the reference target object distance storage section 43. That is, the target object distance after being traveled is updated as the reference target object distance, every time the focus-lens 12 is traveled in the manual-focus control.

Incidentally, the manual-focus control consists of the steps S104 and S105.

Figure 5:
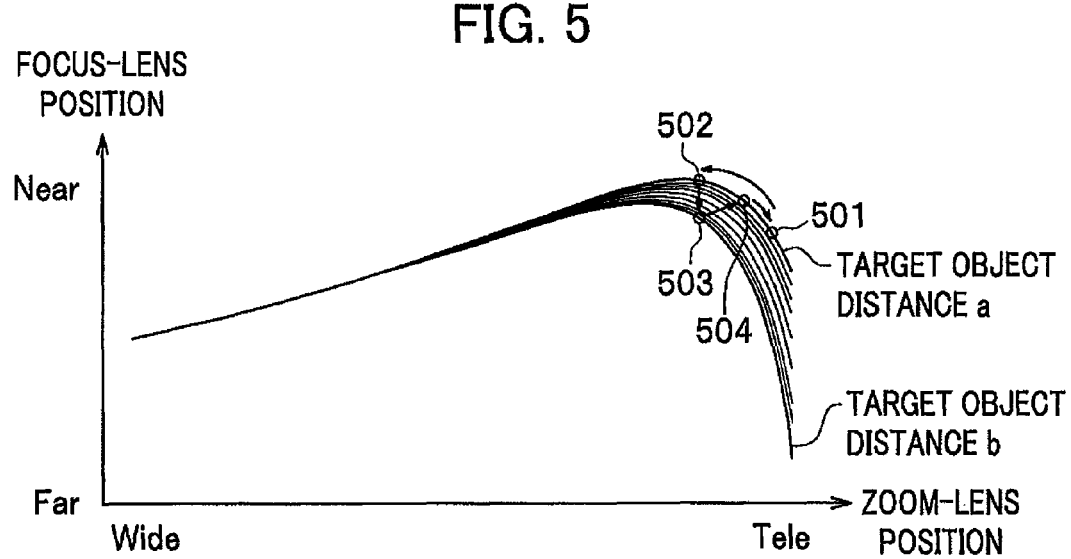
FIG. 5 is a schematic diagram showing operations of the zoom-lens and the focus-lens of the present invention.

Here, for example, as shown in FIG. 5, the positions of the zoom-lens 11 (lens for magnification adjustment) and the focus-lens 12 (focus adjustment lens), immediately after the step S105, are the positions of the point 501. Since the point 501 is plotted on the curve of the target object distance a, it is deemed that the user has performed focus adjustment on the target object located at the target object distance a. In addition, the image sensing device 1 stores the target object distance a as the reference target object distance.

On the other hand, when the focus control is not requested (step S104: No), in the step S106, the system control section 60 determines whether the user issues the focusing request or not. Here, the focusing request is a request to switch from the manual control to the auto-focus control, and to switch back from the auto-focus control to the manual control after detecting the in-focus position. That is, this is a request to transition to the auto-focus control for performing focus adjustment. Accordingly, the in-focus position can be adjusted, even if the focusing precision is deteriorated during the manual control.

When the focusing is requested by the user (step S106: Yes), the operation proceeds to the step S112 (see FIG. 3).

On the other hand, when the focusing is not requested by the user (step S106: No), in the step S107, the system control section 60 determines whether the user issues a zooming control request or not. That is, this is to determine whether the user issues the command to drive the zoom-lens 11 (magnification adjustment lens) or not.

Figure 4:
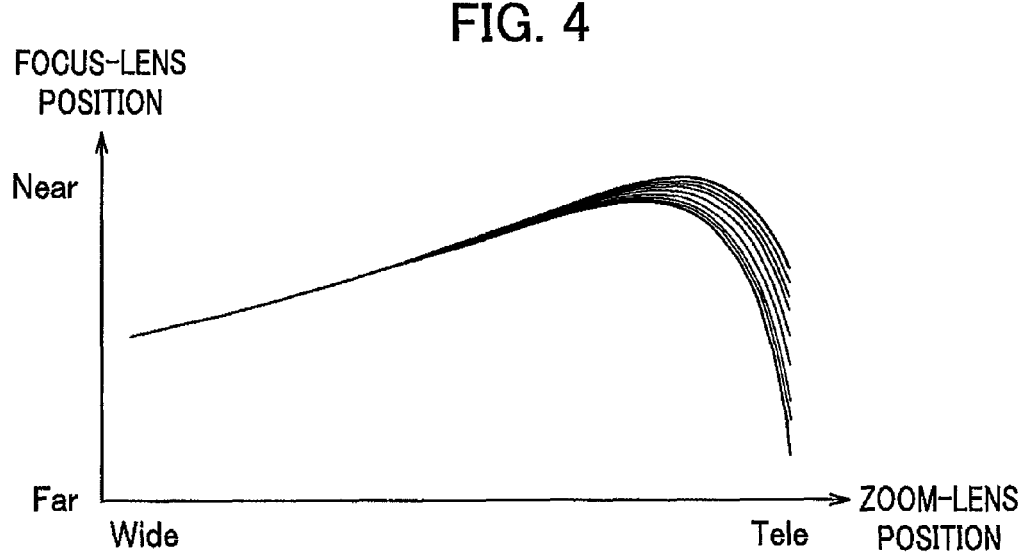
FIG. 4 is a diagram graphically showing an example of the lens in-focus trajectory data.

When the zooming control is requested by the user (step S107: Yes), in the step S108, the image sensing device 1 drives the zoom-lens 11 (magnification adjustment lens) and also drives the focus-lens 12 (focus adjustment lens) based on the stored reference target object distance. That is, the system control section 60 outputs the lens in-focus trajectory data (see FIG. 4) of the reference target object distance stored in the reference target object distance storage section 43, to the focus control command section 22. The focus control command section 22 determines both positions of the zoom-lens 11 (magnification adjustment lens) and the focus-lens 12 (focus adjustment lens) based on the position of the zoom-lens after being driven as commanded by the user and on the lens in-focus trajectory data. Based on the determined positions, the zoom-lens drive section 31 drives the zoom-lens 11 (magnification adjustment lens) and the focus-lens drive section 30 drives the focus-lens 12 (focus adjustment lens). Accordingly, the focus-lens 12 (focus adjustment lens) can be driven so as to retain the reference target object distance stored in the step S103, regardless the current target object distance. Incidentally, the reason why to describe "so as to retain" here is that if the current target object distance is away from the reference target object distance, it is difficult to move the focus-lens 12 instantly to the reference target object distance, when, for example, traveling from the point 503 to the point 504 as shown in FIG. 5. Therefore, "so as to retain" is described in order to include the significance of the driving to gradually approach the reference target object distance.

Incidentally, the manual-focus-trace control consists of the step S107 and the step S108.

In the step S109, the system control section 60 determines whether the zooming control stop is requested by the user or not. That is, this is to determine whether the user has issued the command to stop driving the zoom-lens 11 (magnification adjustment lens) or not.

When the zooming control stop is not requested by the user (step S109: No), the operation returns to the step S108.

On the other hand, when the zooming control stop is requested by the user (step S109: Yes), the zoom-lens drive section 31 stops driving the zoom-lens 11 (magnification adjustment lens) and the focus-lens drive section 30 stops driving the focus-lens 12 (focus adjustment lens). Subsequently, the processing of the image sensing device 1 proceeds to the step S112 (See FIG. 3).

Here, for example, as shown in FIG. 5, the positions of the zoom-lens 11 (magnification adjustment lens) and the focus-lens 12 (focus adjustment lens) are the positions of the point 502, after the zoom-lens 11 (magnification adjustment lens) is driven upon the command issued by the user. Based on the command issued by the user, the zoom-lens 11 (magnification adjustment lens) is driven and also the position of the focus-lens 12 (focus adjustment lens) travels to the position of the point 502 along the curve of the reference target object distance a.

The steps S110 and S111 will be described later.

Figure 3:
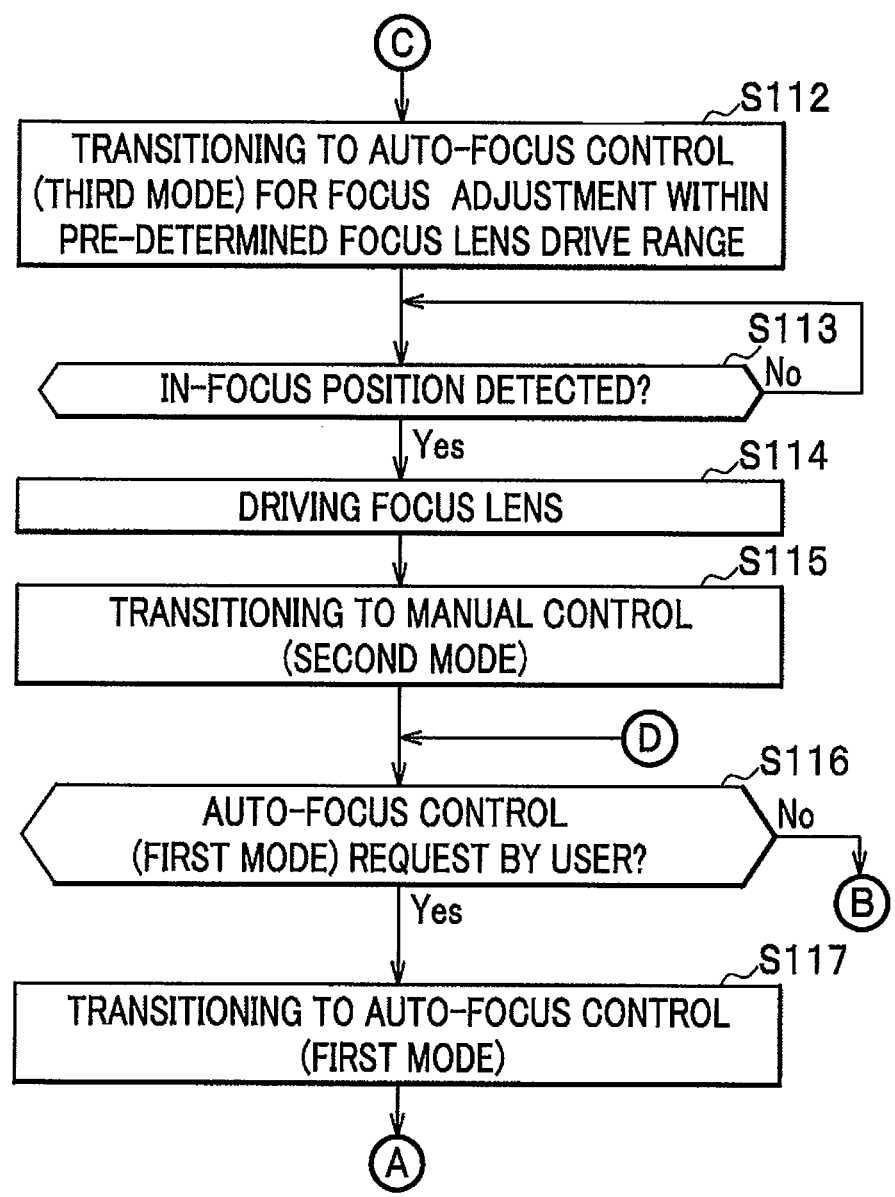
FIG. 3 is a flow chart showing a processing operation of an image sensing device of the present invention.

Hereinafter, FIG. 3 is referred to.

In the step S112, the system control section 60 transitions to the auto-focus control (third mode) for performing focus adjustment within the pre-determined focus-lens drive range. That is, the system control section 60 switches the target object to be commanded from the manual-focus control section 24 to the auto-focus control section 23 via the focus control command section 22. The focus control command section 22 restricts the drive range of the focus-lens 12 (focus adjustment lens) which is narrower than that of the auto-focus control for the normal operation. At this point, the purpose of the auto-focus control (third mode) is a fine adjustment for the out-of-focus position which is caused in the manual control (the manual-focus control or the manual-focus-trace control), thus, by restricting the drive range of the focus-lens 12 (focus adjustment lens), the unnecessary driving of the lens is prohibited, consequently, the adjustment to acquire the in-focus lens position can be performed in a comfortable manner. Furthermore, it is arbitrary to restrict the drive range of the focus-lens 12 (focus adjustment lens).

Hereinafter, the auto-focus control (third mode) for performing focus adjustment consists of the steps down to the step S114.

In the step S113, the focus control command section 22 determines whether the position in the in-focus state (in-focus position) of the focus-lens 12 (focus adjustment lens) is detected or not.

In the case that the in-focus position of the focus-lens 12 is not detected (step S113: No), the focus control command section 22 continues detecting the in-focus position of the focus-lens 12 (focus adjustment lens)

On the other hand, in the case that the in-focus position of the focus-lens 12 is detected (step S113: Yes), in the step S114, the focus-lens drive section 30 drives the focus-lens 12 (focus adjustment lens).

In the step S115, the system control section 60 transitions to the manual control (second mode). In this case, even if the current target object distance moves from the reference target object distance after being driven, the reference target object distance is not to be updated.

Here, referring back to the step S107 of FIG. 2, described is the transition to the auto-focus control (third mode) which is caused by the temperature change.

When the zooming control is not requested by the user (step S107: No), in the step S110, the temperature detection section 33 acquires the current temperature with regard to the optical system 10 as the temperature information.

In the step S111, the system control section 60 determines whether the current temperature is out of the pre-determined range or not. That is, this is to determine whether the temperature has changed largely enough to require the focus adjustment or not. Here, the pre-determined range is, for example, equal to or greater than 40 degrees Celsius, or equal to or less than 0 degree Celsius.

When the current temperature is within the pre-determined range (step S111: No), the operation proceeds to the step S116 (see FIG. 3).

On the other hand, when the current temperature is out of the pre-determined range (S111: Yes), in the step S112 (FIG. 3), the system control section 60 transitions to the auto-focus control (third mode) for performing focus adjustment.

Thereafter, steps down to the step S115 are as aforementioned.

Due to the auto-focus control (third mode) for performing this focus adjustment, the physical change of the plastic component or the like under the influence of the temperature sometimes results in the substantial change of the in-focus distance of the image sensing device. However, even in the case of the out-of-focus position caused by such a change of the in-focus distance, the in-focus position of the focus-lens 12 (focus adjustment lens) can be acquired.

Here, when the focus adjustment is performed based on any of the focusing requested by the user (step S106) (provided that the focusing is requested at the position of the point 502), the zooming control stop requested by the user (step S109), or the temperature change (step S111), for example, as shown in FIG. 5, the positions of the zoom-lens 11 (magnification adjustment lens) and the focus-lens 12 (focus adjustment lens) are the positions of the point 503, after the auto-focus control (third mode) for performing focus adjustment. Consequently, the image sensing device 1 performs focus adjustment on the target object located at the target object distance b, by the auto-focus control (third mode) for performing focus adjustment. On the other hand, the reference target object distance is not updated and maintains the target object distance a.

In the step S116, the system control section 60 determines whether the auto-focus control (first mode) start is requested by the user or not.

When the auto-focus control (first mode) start is not requested by the user (step S116: No), the operation proceeds to the step S104 for the processing of the image sensing device 1.

On the other hand, when the auto-focus control (first mode) start is requested by the user (step S116: Yes), in the step S117, the system control section 60 transitions to the auto-focus control (first mode). That is, the system control section 60 issues a command of the auto-focus control to the focus control command section 22, subsequently, the focus control command section 22 switches the object to be commanded to the auto-focus control section 23. Accordingly, the auto-focus control (first mode) is started, and the manual control (second mode) is stopped. Subsequently, the operation returns to the step S101 for the processing of the image sensing device 1.

By the way, in the image sensing device 1, the auto-focus control (third mode) for performing focus adjustment is a control exclusively for the temporary fine adjustment. Therefore, next time when the zooming control is requested by the user (for example, step S116: No→step S104: No→step S106: No→step S107: Yes), the image sensing device 1 drives the zoom-lens 11 (magnification adjustment lens) and also drives the focus-lens 12 (focus adjustment lens) so as to retain the reference target object distance based on the reference target object distance stored last time, not based on the current target object distance.

For example, as shown in FIG. 5, in the case that the positions of the zoom-lens 11 (magnification adjustment lens) and the focus-lens 12 (focus adjustment lens) during the zooming control are the positions of the point 503, when the user travels the zoom-lens 11 (magnification adjustment lens) to the position of the point 501, the position of the focus-lens 12 (focus adjustment lens) moves back to the curve of the target object distance a and also travels towards the position of the point 501, then, travels to a position of the point 501 along the curve of the target object distance a, after the position of the point 504 is reached.

The reason of the aforementioned description is as follows. After the temporary fine adjustment is performed, if the reference target object distance is updated, there is a possibility that the reference target object distance is far off the intended distance, under the low focus-drive-resolution condition. As a result, in the case that the zooming control is performed after a certain time has passed, not based on the target object distance of the lens in-focus trajectory data in correspondence with the lens position (current target object distance) just before the zooming control, but based on the reference target object distance which is a target object distance being set when the user has performed focus adjustment last time, the focusing can be adjusted approximately in the target object distance intended by the user when the manual-focus-trace control was performed.

With the aforementioned operations, regardless of the focus drive resolution (wide-side or tele-side), no matter which zoom-lens position has been taken when the auto-focus control (third mode) for the focus adjustment is performed, the in-focus state is generally maintained during the zooming control, when the zooming control is subsequently performed.

Moreover, the frequency to utilize the focus-lens 12 (focus adjustment lens) operation is minimized, accordingly, the abrasion of the focus-lens 12 (focus adjustment lens) which is caused by the driving of the focus-lens 12 (focus adjustment lens) is decreased.

MODIFIED EXAMPLE

As above, one embodiment of the present invention is described. However, it should be further understood by those skilled in the art that the present invention is not limited to the embodiment set forth hereinabove and may take on modifications and alterations without departing from the spirit of the present invention, for example, as follows.

The present invention is, in light of the driving life of the focus-lens 12 (focus adjustment lens), especially effective for the surveillance cameras which perform a long-time video-shooting and in addition, also effective for other image sensing devices such as professional cameras, video cameras, digital video cameras and the like.

Moreover, in the step S110, the image sensing device 1 acquires the current temperature. However the image sensing device 1 may acquire the current temperature immediately after the steps S103 and S113 and may determine whether the temperature difference between both of the above temperatures is out of the pre-determined range or not in the step S111.

In addition, in the case that the intensity evaluation value is out of the pre-determined range, the transition to the step S112 may be prohibited. This is because the auto-focus control doesn't function effectively, in the case that the screen is too bright or too dark. Otherwise, the transition to the step S112 may be put into a stand-by mode, then once the target object condition changes and the intensity evaluation value comes into the pre-determined range, the transition to the step S112 may be performed.

Furthermore, in the step S113, in the case that the intensity evaluation value is out of the pre-determined range during the auto-focus control (third mode) for performing focus adjustment, the position of the focus-lens 12 (focus adjustment lens) may be set back to the position with which a target object in the reference target object distance is in focus and the operation may proceed to the step S115. Accordingly, in the case of the target object for which the in-focus position is difficult to detect, the focus adjustment can be performed to the reference target object distance, without the fine adjustment of the position of the focus-lens 12 (focus adjustment lens) by the auto-focus control (third mode) for performing focus adjustment.

Furthermore, although the intensity evaluation value is explained as an example above, the illuminance evaluation value which is an intensity level of the video signal may be utilized as the determination condition. In addition, the focus evaluation value may be utilized as the determination condition. This gives an effect which is similar to that in the case utilizing the intensity evaluation value.

That is, explaining an example of the focus evaluation value, in the case of the low contrast that the focus evaluation value is an evaluation value which is equal to or less than the pre-determined value, the transition to the step S112 may be prohibited. Otherwise, the transition to the step S112 may be put into the stand-by mode, thereafter, when the focus evaluation value becomes an evaluation value indicating a greater contrast than the pre-determined value, the transition to the step S112 may be performed.

Furthermore, in the step S113, in the case of the low contrast that the focus evaluation value is an evaluation value which is equal to or less than the pre-determined value during the auto-focus control (third mode) for performing focus adjustment, the position of the focus-lens 12 (focus adjustment lens) may be set back to the position at which a target object in the reference target object distance is in focus and subsequently the step S115 may be taken.

In the step S113, in the case that the in-focus position of the focus-lens 12 (focus adjustment lens) is detected, after measuring the in-focus duration time which is a time for being in the in-focus state with the time measurement section 34, the operation may proceed to the step S114 when the in-focus duration time is equal to or longer than the pre-determined time, for example 4 seconds. Accordingly, the focus adjustment can be performed on a stable target object.

In addition, in the case of a command issued by the user or a button manipulation performed by the user in any of the steps, a priority may be given to the command issued by the user or a button manipulation performed by the user. For example, if a command is issued by the user or a button manipulation is performed by the user while the position of the focus-lens 12 (focus adjustment lens) is being traveled back to the reference target object distance, a priority may be given to the command or the button manipulation. Accordingly, the user can perform the operation in a comfortable manner.

Moreover, in the manual control (the manual-focus control or the manual-focus-trace control) (second mode) and the auto-focus control (first mode or third mode), the driving-wave height of either of the zoom-lens 11 (magnification adjustment lens) or the focus-lens 12 (focus adjustment lens) may be switched, or the driving-wave height of both lenses may be switched. For example, the driving-wave height during the manual control (the manual-focus control or the manual-focus-trace control) (second mode) may be set at a value less than that of the driving-wave height during the auto-focus control (first mode or third mode). Accordingly, the power consumption can be suppressed.

In addition, the surveillance cameras have a unique function which is a preset function to store the information of the positions of the zoom-lens 11 (magnification adjustment lens) and the focus-lens 12 (focus adjustment lens) in the internal memory in advance, and to drive the lenses to the stored lens positions. The embodiment can be applied to this function. For example, each of the reference target object distance is preset corresponding to each of the preset positions, thereafter, when traveling to the preset position, the focus-lens 12 (focus adjustment lens) is driven so as to retain the reference target object distance which has been preset, in a manner harmonized with the zoom-lens 11 (magnification adjustment lens) traveling.

What is claimed is:

1. An image sensing device comprising:
a lens group having a magnification adjustment lens and a focus adjustment lens;
a focus evaluation detection section for detecting a focus evaluation value which evaluates an in-focus state of the lens group;
a lens in-focus trajectory data storage section for storing lens in-focus trajectory data which is pre-determined data to indicate a lens position of the lens group in the in-focus state;
a reference target object distance storage section for storing a target object distance; and
a system control section having a first mode to simultaneously operate and automatically set the in-focus state of the lens group, a second mode to drive the magnification adjustment lens or the focus adjustment lens based on a user command, and a third mode to transition to the first mode under a pre-determined condition in the second mode, and to automatically set the in-focus state of the lens group,
wherein the system control section stores a target object distance as a reference target object distance in the reference target object distance storage section based on the lens focusing trajectory data when the focus adjustment lens is driven by the user command in the second mode, drives the focus adjustment lens so as to retain the reference target object distance not based on a current target object distance but based on the lens in-focus trajectory data and the reference target object distance when the magnification adjustment lens is driven by the user command, and transitions to the second mode again without updating the reference target object distance after the third mode.

2. The image sensing device according to claim 1, wherein the system control section transitions to the third mode when a focusing is requested by a user command in the second mode.

3. The image sensing device according to claim 1, wherein the system control section determines whether driving of the magnification adjustment lens has stopped or not when the magnification adjustment lens is driven by a user command in the second mode, and transitions to the third mode when determining that the driving of the magnification adjustment lens has stopped.

4. The image sensing device according to claim 1, further comprising a temperature detection section for detecting temperature information regarding the lens group, wherein the system control section transitions to the third mode when the temperature information is out of a pre-determined range in the second mode.

5. The image sensing device according to claim 1, wherein the system control section restricts the drive range of the focus adjustment lens in the third mode and automatically sets an in-focus state of the lens group.

6. The image sensing device according to claim 1, further comprising an intensity evaluation detection section for detecting an intensity evaluation value to evaluate an intensity level on a screen, wherein the system control section prohibits transitioning to the third mode when the intensity evaluation value is out of the pre-determined range.

7. The image sensing device according to claim 1, further comprising the intensity evaluation detection section for detecting the intensity evaluation value to evaluate the intensity level on the screen, wherein the system control section transitions to a stand-by mode without transitioning to the third mode when the intensity evaluation value is out of the pre-determined range and transitions to the third mode when the intensity evaluation value is within the pre-determined range.

8. The image sensing device according to claim 1, further comprising the intensity evaluation detection section for detecting the intensity evaluation value to evaluate the intensity level on the screen, wherein the system control section transitions to the second mode without setting the in-focus state of the lens group when the intensity evaluation value is out of the pre-determined range in the third mode.

9. The image sensing device according to claim 1, wherein the system control section prohibits transitioning to the third mode when the focus evaluation value is equal to or less than the pre-determined value.

10. The image sensing device according to claim 1, wherein the system control section transitions to a stand-by mode without transitioning to the third mode when the focus evaluation value is equal to or less than the pre-determined value and transitions to the third mode when the focus evaluation value is greater than the pre-determined value.

11. The image sensing device according to claim 1, wherein the system control section transitions to the second mode without setting the in-focus state of the lens group when the focus evaluation value is equal to or less than the pre-determined value in the third mode.

12. The image sensing device according to claim 1, further comprising a time measurement section for measuring an in-focus duration time which is a duration time of the in-focus state of the lens group, wherein the system control section transitions to the second mode when the in-focus duration time is equal to or greater than the pre-determined value in the third mode.

13. The image sensing device according to claim 1, wherein the system control section transitions to the third mode in the case that the focusing is requested by a user command while the magnification adjustment lens is driven by the user command in the second mode.

14. An image sensing device control method of an image sensing device comprising:
   a lens group having a magnification adjustment lens and a focus adjustment lens;
   a focus evaluation detection section for detecting a focus evaluation value which evaluates an in-focus state of the lens group;
   a lens in-focus trajectory data storage section for storing in-focus trajectory data which is pre-determined data to indicate a lens position of the lens group in an in-focus state; and
   a system control section for controlling the lens group,
wherein the system control section carries out the steps of:
   storing a target object distance as a reference target object distance in a reference target object distance storage section based on the lens in-focus trajectory data when the focus adjustment lens is driven by a user command;
   driving the focus adjustment lens so as to retain the reference target object distance not based on a current target object distance but based on the lens in-focus trajectory data and the reference target object distance when the magnification adjustment lens is driven by the user command;
   automatically setting the in-focus state of the lens group without updating the reference target object distance; and
   transitioning to a mode to drive the magnification adjustment lens or the focus adjustment lens based on the user command.

15. A non-transitory computer readable medium with an executable program stored thereon to cause an image sensing device to execute an image sensing device control method, where the image sensing device includes a lens group having a magnification adjustment lens and a focus adjustment lens, a focus evaluation detection section for detecting a focus evaluation value which evaluates an in-focus state of the lens group, a lens in-focus trajectory data storage section for storing lens in-focus trajectory data which is pre-determined data to indicate a lens position of the lens group in an in-focus state, and a system control section for controlling the lens group, the image sensing method comprising the steps of:
   storing a target object distance as a reference target object distance in a reference target object distance storage section based on the lens in-focus trajectory data when the focus adjustment lens is driven by a user command;
   driving the focus adjustment lens so as to retain the reference target object distance not based on a current target object distance but based on the lens in-focus trajectory data and the reference target object distance when the magnification adjustment lens is driven by the user command;
   automatically setting the in-focus state of the lens group without updating the reference target object distance; and
   transitioning to a mode to drive the magnification adjustment lens or the focus adjustment lens based on the user command.

* * * * *